(12) United States Patent
Sung

(10) Patent No.: US 9,451,850 B2
(45) Date of Patent: Sep. 27, 2016

(54) ICE SHAVING MACHINE

(71) Applicant: GLOBAL BEAR CORP., Taichung (TW)

(72) Inventor: Kun-Wei Sung, Taichung (TW)

(73) Assignees: Kun-Wei Sung, Taichung (TW); Global Bear Corp., Taichung (TW)

( * ) Notice: Subject to any disclaimer, the term of this patent is extended or adjusted under 35 U.S.C. 154(b) by 377 days.

(21) Appl. No.: 14/242,921

(22) Filed: Apr. 2, 2014

(65) Prior Publication Data

US 2015/0285547 A1 Oct. 8, 2015

(51) Int. Cl.
*A47J 43/25* (2006.01)
*F25C 5/04* (2006.01)
*F25C 5/12* (2006.01)
*F25C 5/02* (2006.01)

(52) U.S. Cl.
CPC ............... *A47J 43/25* (2013.01); *F25C 5/046* (2013.01); *F25C 5/12* (2013.01); *F25C 5/02* (2013.01)

(58) Field of Classification Search
CPC ............ F25C 5/02; F25C 5/12; F25C 5/046; A47J 43/25
USPC ........................................ 241/DIG. 17, 285.2
See application file for complete search history.

(56) References Cited

U.S. PATENT DOCUMENTS

| | | | | |
|---|---|---|---|---|
| 1,077,482 A * | 11/1913 | Lippincott | ............... | A47J 43/25 241/100 |
| 2,627,377 A * | 2/1953 | Fletcher | .................... | F25C 5/12 241/280 |
| 3,679,140 A * | 7/1972 | Kaishita | ................... | B62D 1/00 241/95 |
| 4,569,266 A * | 2/1986 | Ando | .................... | A23G 9/045 241/101.2 |
| 4,588,136 A * | 5/1986 | Homma | ................. | A23G 9/045 241/168 |
| 4,718,610 A * | 1/1988 | Gallaher | ................ | A23G 9/045 241/101.2 |
| 5,007,591 A * | 4/1991 | Daniels, Jr. | ............... | F25C 5/12 241/169.1 |
| 5,402,949 A * | 4/1995 | Berner | ................... | A23G 9/045 241/101.2 |
| 5,513,810 A * | 5/1996 | Lin | ........................ | B26D 3/225 241/168 |
| 6,012,660 A * | 1/2000 | Colman | .................... | F25C 5/12 241/100 |
| 6,328,236 B1 * | 12/2001 | Upson | ....................... | F25C 5/12 241/95 |
| 6,908,053 B2 * | 6/2005 | Rupp | ..................... | A23G 9/045 241/86.1 |
| 8,807,469 B2 * | 8/2014 | Sung | ..................... | A47J 43/255 241/285.2 |

* cited by examiner

*Primary Examiner* — Faye Francis
(74) *Attorney, Agent, or Firm* — Alan D. Kamrath; Kamrath IP Lawfirm, P.A.

(57) ABSTRACT

An ice shaving machine includes a bottom board, a drive unit located above the bottom board, a limit bracket secured on the bottom of the drive unit, a shaving frame detachably connected with the limit bracket, and a base frame detachably connected with the shaving frame. The limit bracket has a bottom provided with a plurality of first locking grooves. The shaving frame has an interior provided with a receiving chamber. The shaving frame has an upper end provided with a plurality of first locking pieces that are detachably locked in the first locking grooves of the limit bracket and a lower end provided with a plurality of second locking pieces. The base frame has a top provided with a plurality of second locking grooves that are detachably locked onto the second locking pieces of the shaving frame.

6 Claims, 6 Drawing Sheets

ICE SHAVING MACHINE

BACKGROUND OF THE INVENTION

1. Field of the Invention

The present invention relates to a shaving machine and, more particularly, to an ice shaving machine for shaving an ice block into a lot of ice slices or chips.

2. Description of the Related Art

A conventional ice shaving machine 1 in accordance with the prior art shown in FIGS. 6 and 7 comprises a recessed base 12, a main body 11 mounted on the top of the base 12, a platform 13 mounted on the main body 11 and provided with a slotted shaving blade 15, a rotation disk 14 rotatably and movably mounted in the main body 11, a swivel handle (not labeled) swivelably mounted on the main body 11 and connected with the rotation disk 14, and a placement dish 17 mounted in the base 12 and located under the shaving blade 15 of the main body 11. When the conventional ice shaving machine 1 is in use, an ice block 16 is initially received in the main body 11 and placed on the platform 13 of the main body 11. Then, the swivel handle 17 is revolved to drive the rotation disk 14 so that the rotation disk 14 is moved downward to press the ice block 16. Then, the rotation disk 14 is driven and rotated by a driving motor (not shown) to rotate the ice block 16 so that the ice block 16 is turned by the rotation disk 14 and shaved by the shaving blade 15 to form a lot of ice chips which are extended through the shaving blade 15 and are injected toward the placement dish 17. However, the platform 13 is fixed and cannot be detached from the main body 11 so that it is difficult to clean the inside of the main body 11, thereby easily causing a sanitary problem.

BRIEF SUMMARY OF THE INVENTION

The primary objective of the present invention is to provide a composite ice shaving machine whose shaving frame and base frame can be combined and detached easily.

In accordance with the present invention, there is provided an ice shaving machine comprising a bottom board, a drive unit located above the bottom board, a limit bracket secured on a bottom of the drive unit, a shaving frame detachably connected with the limit bracket, and a base frame detachably connected with the shaving frame. The limit bracket is provided with a through hole. The limit bracket has a bottom provided with a plurality of first locking grooves. The shaving frame has an interior provided with a receiving chamber. The shaving frame has an upper end provided with a plurality of first locking pieces that are detachably locked in the first locking grooves of the limit bracket. The shaving frame has a lower end provided with a plurality of second locking pieces. The base frame has a top provided with a plurality of second locking grooves that are detachably locked onto the second locking pieces of the shaving frame.

Preferably, each of the first locking grooves of the limit bracket has a first end provided with an entrance and a second end provided with a stop.

Preferably, each of the second locking grooves of the base frame has a first end provided with an entrance and a second end provided with a stop.

Preferably, the base frame has a bottom provided with an outlet port. The ice shaving machine further comprises a holder mounted on the base frame and provided with a threaded tube, an enclosure mounted on the base frame, a shaving blade mounted on the holder and extended into the outlet port of the base frame, a pressing block mounted on the holder and pressing the shaving blade, and a screw member extended through the pressing block and screwed into the threaded tube of the holder.

Preferably, the enclosure has a height greater than the maximum height of the shaving blade and the pressing block on the holder.

Preferably, the receiving chamber of the shaving frame has a diameter greater than the maximum outer diameter of the ice block.

According to the primary advantage of the present invention, the shaving frame can be removed from the limit bracket, and the base frame can be removed from the shaving frame, so that the shaving frame and the base frame can be detached and cleaned easily and conveniently so as to facilitate a user cleaning the shaving frame and the base frame, and to achieve a sanitary purpose.

According to another advantage of the present invention, the shaving frame is mounted on and detached from the limit bracket easily and quickly, while the base frame is mounted on and detached from the shaving frame easily and quickly, so as to facilitate the user assembling and dismantling the shaving frame and the base frame.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
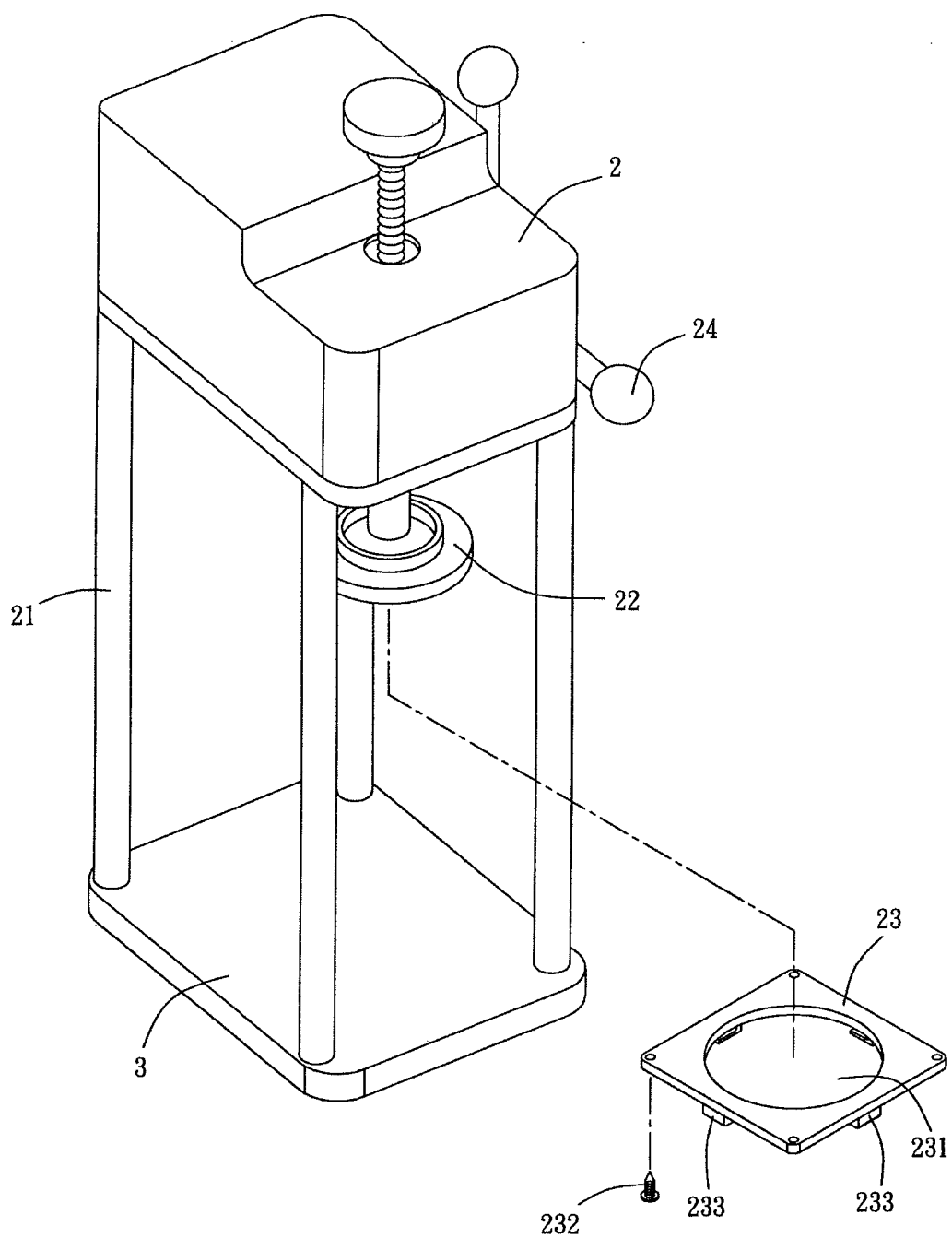
FIG. 1 is a partially exploded perspective view of an ice shaving machine in accordance with the preferred embodiment of the present invention.
Figure 2:
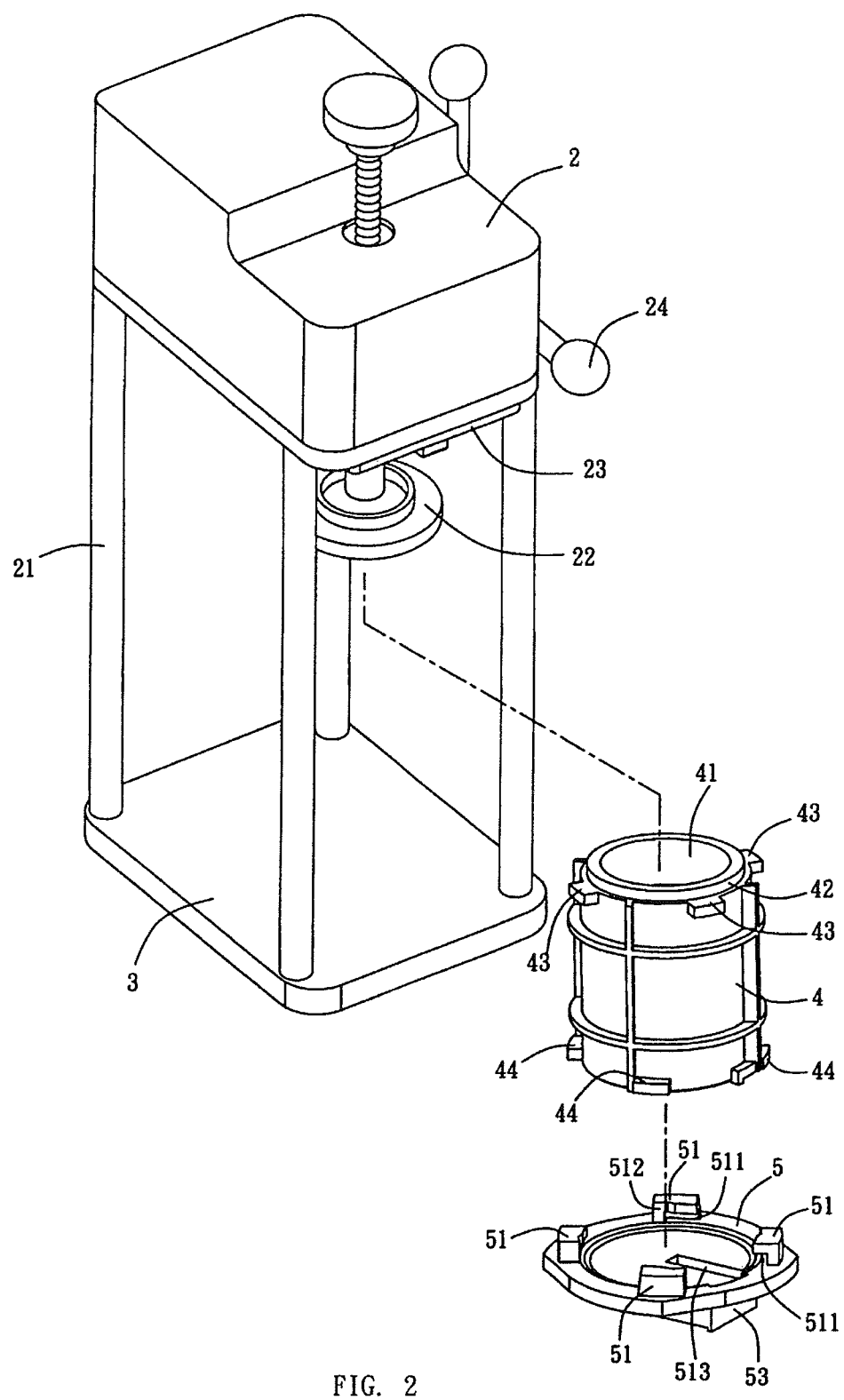
FIG. 2 is a partially exploded perspective view of the ice shaving machine in accordance with the preferred embodiment of the present invention.
Figure 3:
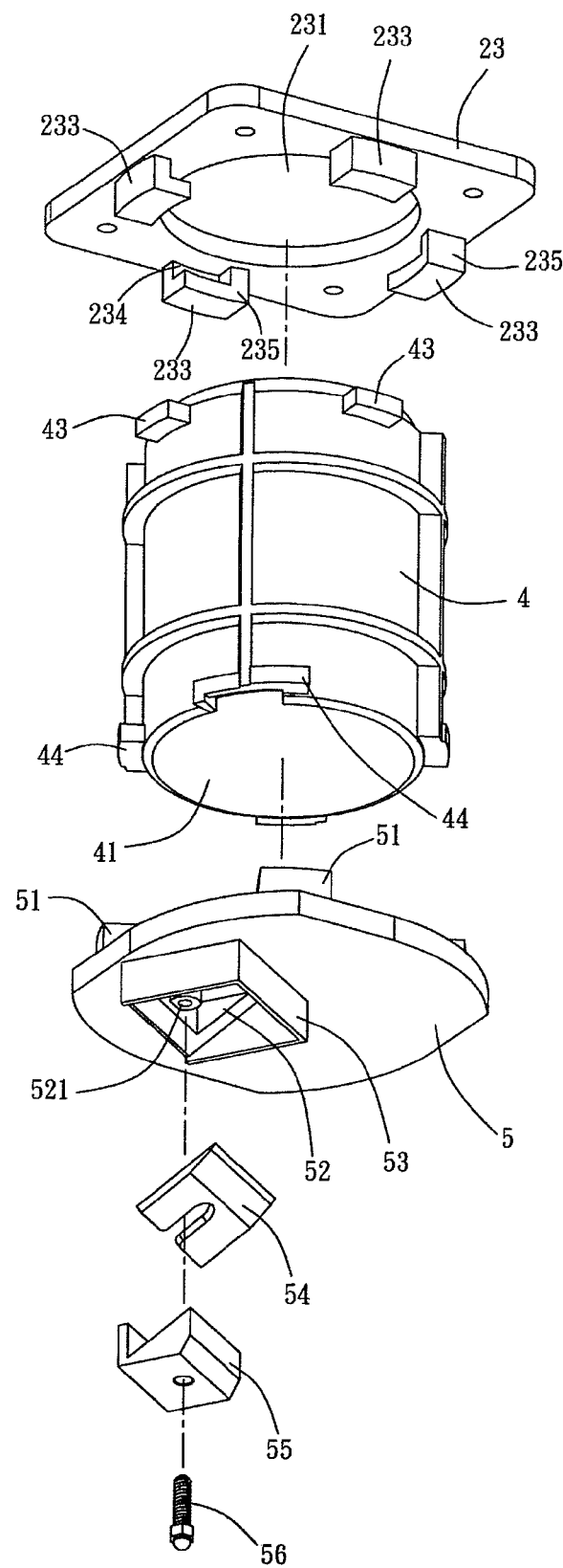
FIG. 3 is a partially bottom exploded perspective view of the ice shaving machine in accordance with the preferred embodiment of the present invention.
Figure 4:
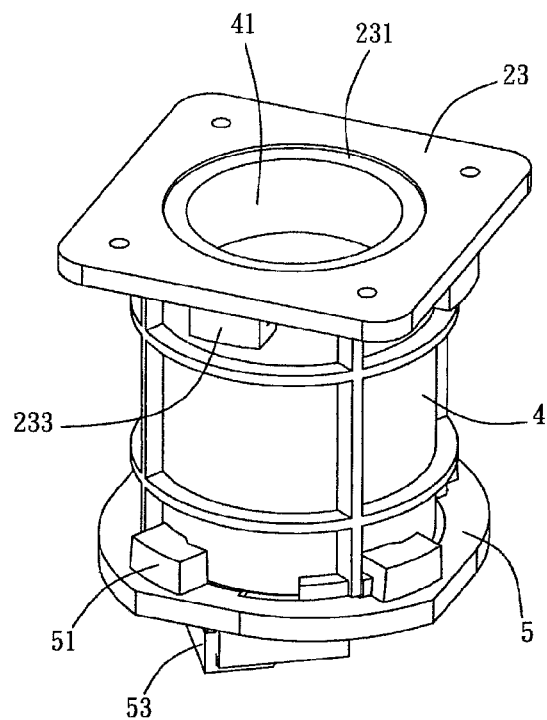
FIG. 4 is a perspective assembly view of the ice shaving machine as shown in FIG. 3.
Figure 5:
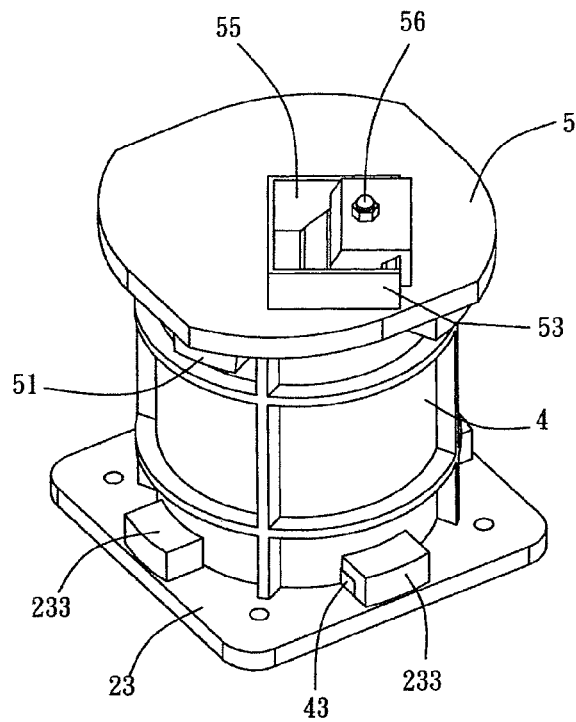
FIG. 5 is a bottom perspective view of the ice shaving machine as shown in FIG. 4.
Figure 6:
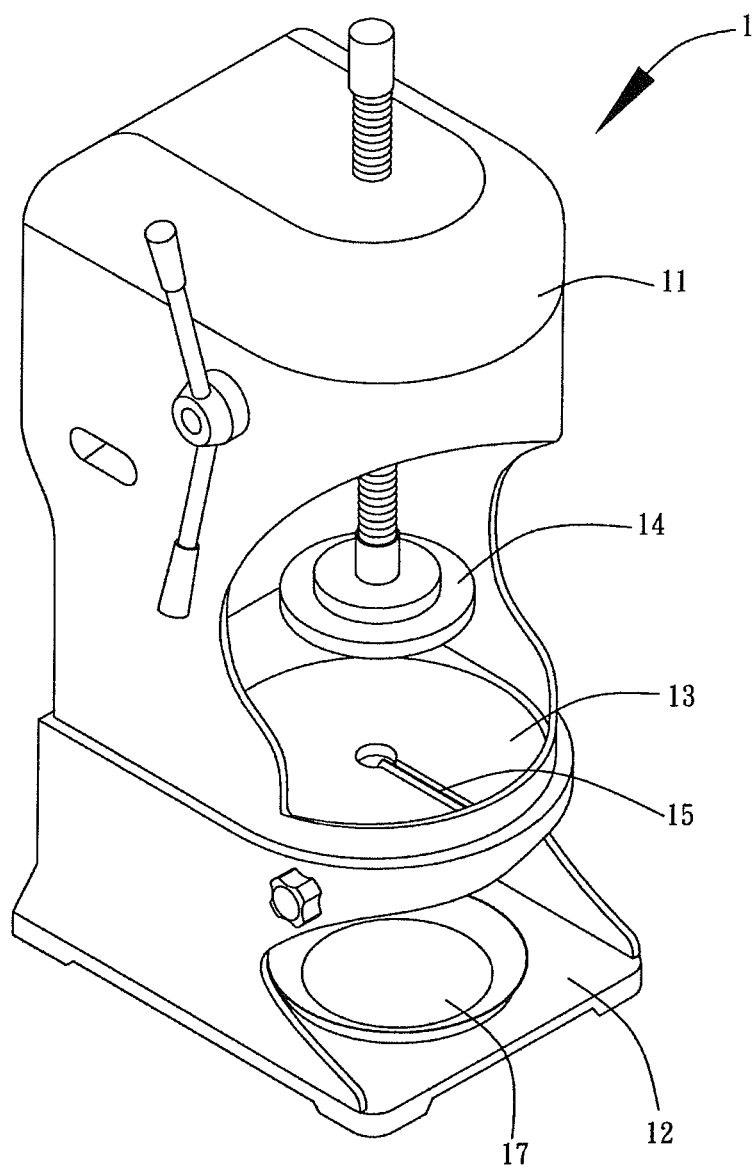
FIG. 6 is a perspective view of a conventional ice shaving machine in accordance with the prior art.
Figure 7:
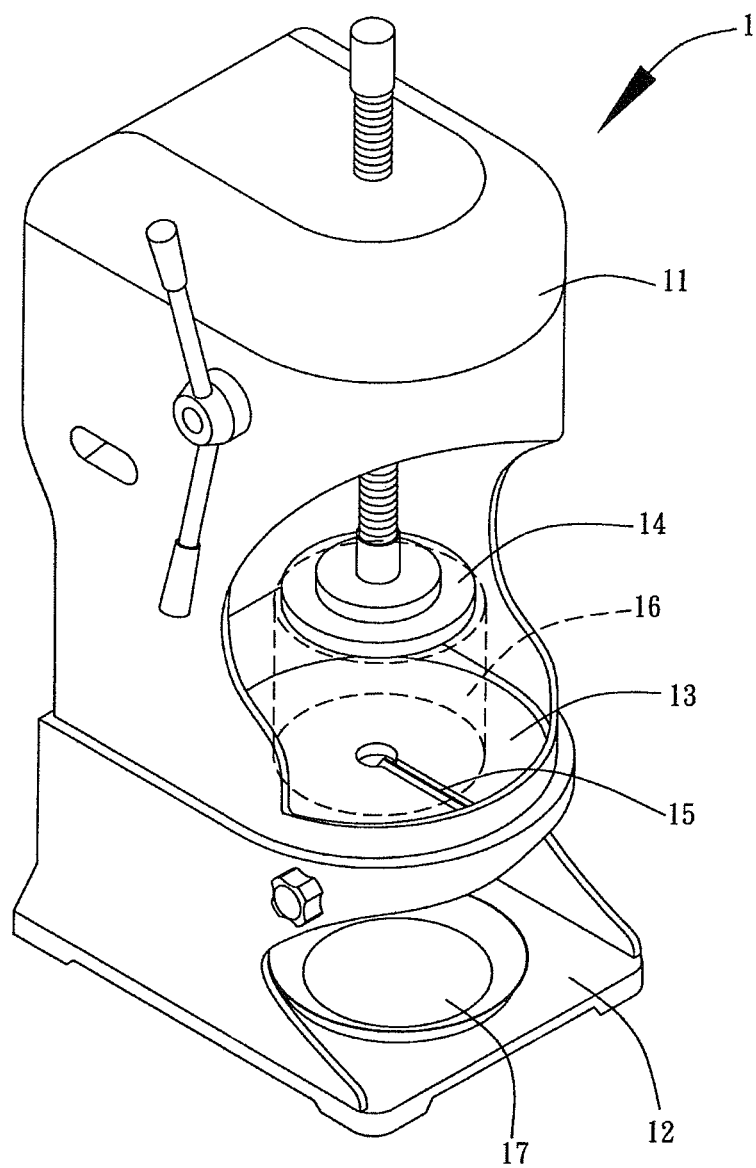
FIG. 7 is a schematic operational view of the conventional ice shaving machine as shown in FIG. 6.

Referring to FIGS. 1-5, an ice shaving machine in accordance with the preferred embodiment of the present invention comprises a bottom board 3, a drive unit 2 located above the bottom board 3, a plurality of support posts 21 mounted between the drive unit 2 and the bottom board 3, a limit bracket 23 secured on a bottom of the drive unit 2, a rotation disk 22 mounted on the drive unit 2, a driving handle 24 mounted on the drive unit 2, a motor (not shown) mounted on the drive unit 2, a switch (not shown) mounted on the drive unit 2, a shaving frame 4 detachably connected with the limit bracket 23, and a base frame 5 detachably connected with the shaving frame 4. The rotation disk 22 is driven and rotated by the motor. The driving handle 24 is pivoted to drive the rotation disk 22 to move upward and downward. The shaving frame 4 and the base frame 5 are arranged between the drive unit 2 and the bottom board 3.

The limit bracket 23 is secured on the bottom of the drive unit 2 by a plurality of screw members 232. The limit bracket 23 is provided with a through hole 231 to allow passage of the rotation disk 22. The through hole 231 of the limit bracket 23 has a circular shape and has a diameter greater than the maximum outer diameter of the rotation disk 22. The limit bracket 23 has a bottom provided with a plurality of first locking grooves 233. Each of the first locking grooves 233 of the limit bracket 23 has a first end provided with an entrance 234 and a second end provided with a stop 235.

The shaving frame 4 is a hollow chamber and has an interior provided with a receiving chamber 41 to receive an ice block (not shown). The receiving chamber 41 of the shaving frame 4 has a diameter greater than the maximum outer diameter of the ice block. The shaving frame 4 has an outer diameter greater than the inner diameter of the through hole 231 of the limit bracket 23. The shaving frame 4 has an upper end provided with a plurality of first locking pieces 43 that are detachably locked in the first locking grooves 233 of the limit bracket 23. The shaving frame 4 has a lower end provided with a plurality of second locking pieces 44. The shaving frame 4 has a top provided with a neck portion 42 inserted into the through hole 231 of the limit bracket 23. The neck portion 42 of the shaving frame 4 has an annular shape and has the maximum outer diameter smaller than an inner diameter of the through hole 231 of the limit bracket 23. The neck portion 42 of the shaving frame 4 has a height equal to or smaller than the thickness of the limit bracket 23 and has a bottom abutting the bottom of the limit bracket 23. The neck portion 42 of the shaving frame 4 is located above each of the first locking pieces 43.

The base frame 5 has a top provided with a plurality of second locking grooves 51 that are detachably locked onto the second locking pieces 44 of the shaving frame 4. Each of the second locking grooves 51 of the base frame 5 has a first end provided with an entrance 511 and a second end provided with a stop 512. The base frame 5 has a bottom provided with an outlet port 513.

The ice shaving machine further comprises a holder 52 mounted on the base frame 5 and provided with a threaded tube 521, an enclosure 53 mounted on the base frame 5, a slotted shaving blade 54 mounted on the holder 52 and extended into the outlet port 513 of the base frame 5, a pressing block 55 mounted on the holder 52 and pressing the shaving blade 54, and a screw member 56 extended through the pressing block 55 and screwed into the threaded tube 521 of the holder 52. The holder 52 is disposed at an inclined state. The pressing block 55 is encompassed by the enclosure 53. The shaving blade 54 is encompassed by the enclosure 53. The enclosure 53 protrudes outward from the bottom of the base frame 5 and has a height greater than the maximum height of the shaving blade 54 and the pressing block 55 on the holder 52.

In assembly, when the limit bracket 23 is mounted on the drive unit 2, the through hole 231 of the limit bracket 23 allows passage of the rotation disk 22. Then, the limit bracket 23 is secured on the bottom of the drive unit 2 by the screw members 232. Then, the second locking grooves 51 of the base frame 5 are aligned with the second locking pieces 44 of the shaving frame 4. Then, the base frame 5 is rotated relative to the shaving frame 4 so that the second locking pieces 44 of the shaving frame 4 are inserted into and locked in the second locking grooves 51 of the base frame 5 respectively to lock the base frame 5 onto the shaving frame 4. At this time, each of the second locking pieces 44 of the shaving frame 4 is extended through the entrance 511 into and stopped by the stop 512 of a respective one of the second locking grooves 51 of the base frame 5. Then, the ice block is placed into and received in the receiving chamber 41 of the shaving frame 4. Then, the shaving frame 4 is mounted on the limit bracket 23, with the neck portion 42 of the shaving frame 4 being inserted into the through hole 231 of the limit bracket 23. At this time, the receiving chamber 41 of the shaving frame 4 allows passage of the rotation disk 22. Then, the first locking pieces 43 of the shaving frame 4 are aligned with the first locking grooves 233 of the limit bracket 23. Then, the shaving frame 4 is rotated relative to the limit bracket 23 so that the first locking pieces 43 of the shaving frame 4 are inserted into and locked in the first locking grooves 233 of the limit bracket 23 respectively to lock the shaving frame 4 onto the limit bracket 23. At this time, each of the first locking pieces 43 of the shaving frame 4 is extended through the entrance 234 into and stopped by the stop 235 of a respective one of the first locking grooves 233 of the limit bracket 23.

In operation, the motor is started by the switch to drive and rotate the rotation disk 22. Then, the driving handle 24 is pivoted to drive the rotation disk 22 to move downward to press the ice block so that the ice block is rotated in concert with the rotation disk 22. In such a manner, the ice block is turned successively by the rotation disk 22 and shaved by the shaving blade 54 to form a lot of ice chips which are extended through the shaving blade 54 and are injected outward from the outlet port 513 of the base frame 5.

When the ice shaving machine is not used, the shaving frame 4 is rotated relative to the limit bracket 23 in the reverse direction to release and detach the first locking pieces 43 of the shaving frame 4 from the first locking grooves 233 of the limit bracket 23 respectively so that the shaving frame 4 is unlocked and can be removed from the limit bracket 23. Then, the base frame 5 is rotated relative to the shaving frame 4 in the reverse direction to release and detach the second locking pieces 44 of the shaving frame 4 from the second locking grooves 51 of the base frame 5 respectively so that the base frame 5 is unlocked and can be removed from the shaving frame 4.

Accordingly, the shaving frame 4 can be removed from the limit bracket 23, and the base frame 5 can be removed from the shaving frame 4, so that the shaving frame 4 and the base frame 5 can be detached and cleaned easily and conveniently so as to facilitate a user cleaning the shaving frame 4 and the base frame 5, and to achieve a sanitary purpose. In addition, the shaving frame 4 is mounted on and detached from the limit bracket 23 easily and quickly, while the base frame 5 is mounted on and detached from the shaving frame 4 easily and quickly, so as to facilitate the user assembling and dismantling the shaving frame 4 and the base frame 5.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. An ice shaving machine comprising:
a bottom board;
a drive unit located above the bottom board;
a limit bracket secured on a bottom of the drive unit;

a shaving frame detachably connected with the limit bracket; and a base frame detachably connected with the shaving frame; wherein:

the limit bracket is provided with a through hole;

the limit bracket has a bottom provided with a plurality of first locking grooves;

the shaving frame has an interior provided with a receiving chamber;

the shaving frame has an upper end provided with a plurality of first locking pieces that are detachably locked in the first locking grooves of the limit bracket;

the shaving frame has a lower end provided with a plurality of second locking pieces; and the base frame has a top provided with a plurality of second locking grooves that are detachably locked onto the second locking pieces of the shaving frame.

2. The ice shaving machine of claim 1, wherein each of the first locking grooves of the limit bracket has a first end provided with an entrance and a second end provided with a stop.

3. The ice shaving machine of claim 1, wherein each of the second locking grooves of the base frame has a first end provided with an entrance and a second end provided with a stop.

4. The ice shaving machine of claim 1, wherein:

the base frame has a bottom provided with an outlet port;

the ice shaving machine further comprises:

a holder mounted on the base frame and provided with a threaded tube;

an enclosure mounted on the base frame;

a shaving blade mounted on the holder and extended into the outlet port of the base frame;

a pressing block mounted on the holder and pressing the shaving blade; and a screw member extended through the pressing block and screwed into the threaded tube of the holder.

5. The ice shaving machine of claim 4, wherein the enclosure has a height greater than the maximum height of the shaving blade and the pressing block on the holder.

6. The ice shaving machine of claim 1, wherein the receiving chamber of the shaving frame has a diameter greater than the maximum outer diameter of the ice block.

* * * * *